US010504304B1

(12) United States Patent
Ferguson

(10) Patent No.: US 10,504,304 B1
(45) Date of Patent: Dec. 10, 2019

(54) CROWD-SOURCED DRIVER GRADING

(71) Applicant: Allstate Insurance Company, Northbrook, IL (US)

(72) Inventor: Dana Ferguson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/427,607

(22) Filed: May 31, 2019

Related U.S. Application Data

(63) Continuation of application No. 16/018,339, filed on Jun. 26, 2018, now Pat. No. 10,360,738, which is a
(Continued)

(51) Int. Cl.
*G07C 5/00* (2006.01)
*B60R 1/00* (2006.01)
*G07C 5/08* (2006.01)
*G06Q 40/08* (2012.01)
*G06Q 50/26* (2012.01)

(52) U.S. Cl.
CPC ............... *G07C 5/008* (2013.01); *B60R 1/00* (2013.01); *G07C 5/0816* (2013.01); *B60R 2300/302* (2013.01); *B60R 2300/50* (2013.01); *B60R 2300/70* (2013.01); *G06Q 40/08* (2013.01); *G06Q 50/265* (2013.01)

(58) Field of Classification Search
CPC .......... G07C 5/008; G07C 5/0816; B60R 1/00
USPC ....................................................... 701/32.3
See application file for complete search history.

(56) References Cited

U.S. PATENT DOCUMENTS 5,942,993 A  8/1999  Mio et al.
6,052,068 A  4/2000  Price R-W et al.
(Continued)

FOREIGN PATENT DOCUMENTS

DE  102008017137 A1  10/2009
EP  2827316 A1  1/2015

OTHER PUBLICATIONS

U.S. Department of Transportation, National Highway Traffic Safety Administration, DOT HS 812 014, Vehicle-to-Vehicle Communications: Readiness of V2V Technology for Application, Aug. 2014, 327 pages.
(Continued)

*Primary Examiner* — Muhammad Shafi
(74) *Attorney, Agent, or Firm* — Banner & Witcoff, Ltd.

(57) ABSTRACT

An video analysis computing system driving analysis may include a camera associated with a first vehicle and having a viewing angle capable of capturing a video of one or more other vehicles in proximity to the first vehicle, a first memory location communicatively coupled to the camera, wherein the first memory location stores video data captured by the camera, and an evaluation module including a processor executing instructions that cause the processor to: evaluate the captured video stored in the first memory location to determine whether a driving event performed by a second vehicle has occurred, assign, in response to an identified driving event performed by the second vehicle, a driving event rating to a video showing the identified driving event, wherein the driving event rating may be calculated, at least in part, using a crowd-sourced driving event rating obtained after posting the video to a social network.

20 Claims, 7 Drawing Sheets

Related U.S. Application Data continuation of application No. 15/130,587, filed on Apr. 15, 2016, now Pat. No. 10,032,318.

(56) References Cited

U.S. PATENT DOCUMENTS

| | | | |
|---|---|---|---|
| 6,433,706 | B1 | 8/2002 | Anderson, III et al. |
| 7,487,252 | B2 | 2/2009 | Vossler |
| 7,725,348 | B1 | 5/2010 | Allen et al. |
| 8,009,870 | B2 | 8/2011 | Simon |
| 8,588,470 | B2 | 11/2013 | Rodriguez Serrano et al. |
| 8,886,418 | B2 | 11/2014 | Yucel et al. |
| 8,954,226 | B1* | 2/2015 | Binion .................... G06Q 40/08 701/33.4 |
| 2005/0073436 | A1 | 4/2005 | Negreiro |
| 2006/0250225 | A1* | 11/2006 | Widmann ............... B60R 1/003 340/438 |
| 2007/0135980 | A1* | 6/2007 | Plante .................... G06Q 50/30 701/33.4 |
| 2007/0136078 | A1* | 6/2007 | Plante .................... G06Q 10/00 348/148 |
| 2012/0095641 | A1* | 4/2012 | Merk ..................... G08G 1/161 701/28 |
| 2013/0093886 | A1* | 4/2013 | Rothschild ........... G08G 1/0175 348/148 |
| 2015/0050906 | A1 | 2/2015 | Yuasa |

OTHER PUBLICATIONS

Genetech, AutoVu Automatic License Plate Recognition, http://www.genetec.com/solutions/all-products/autovu, Feb. 24, 2015, 3 pages.

Vishnevsky, Vladimir M. et al., Design Concepts of an Application Platform for Traffic Law Enforcement and Vehicles Registration Comprising RFID Technology, IEEE 2012 International Conference on RFID—Technologies and Applications (RFID-TA), © 2012 IEEE, pp. 148-153.

Evans-Pughe, Christine, RO4D W4TCH A national system of around 3000 automatic number plate recognition cameras, linked to a central database, is designed to drive 'hot cars' off Britain's roads, engineering & Technology, Jul. 2006, www.theiet.org/engtechmag, pp. 36-39.

* cited by examiner

CROWD-SOURCED DRIVER GRADING

CROSS-REFERENCE TO RELATED APPLICATIONS

The present application is a continuation of co-pending U.S. application Ser. No. 16/018,339 filed Jun. 26, 2018, which is a continuation of co-pending U.S. application Ser. No. 15/130,587, filed Apr. 15, 2016 issued as U.S. Pat. No. 10,032,318 on Jul. 24, 2018. The patent applications identified above is incorporated by reference herein in its entirety

TECHNICAL FIELD

Aspects of the disclosure generally relate to providing rewards to individuals who provide videos of driving events associated with other vehicles encountered on the road, and more specifically with rewarding customers who record video and rate a driving event associated with another vehicle on the road and provide the video for presentation to others for grading via a social network.

BACKGROUND

The collection and analysis of driving data, such as the identification of driving behaviors and/or traffic accidents, has many applications. For example, insurance companies and financial institutions may offer rate discounts or other financial incentives to customers based on safe driving behaviors and accident-free driving records. Law enforcement or government personnel may collect and analyze driving data and traffic accident statistics to identify dangerous driving roads or times, and to detect moving violations and other unsafe driving behaviors. In other cases, driving data may be used for navigation applications, vehicle tracking and monitoring applications, and on-board vehicle maintenance applications, among others.

Vehicle-based computer systems, such as on-board diagnostics (OBD) systems and telematics devices, may be used in automobiles and other vehicles, and may be capable of collecting various driving data and vehicle sensor data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data. Such vehicle-based systems may be capable of collecting driving data which may be used to perform various driving data analyses such as statistical driving evaluations, driver score calculations, etc. Vehicle-based systems also may be configured to detect the occurrence of traffic accidents, for instance, using vehicle body impact sensors and airbag deployment sensors. However, not all vehicles are equipped with systems capable of collecting, analyzing, and communicating driving data. Moreover, a single vehicle may be used by multiple different drivers, and conversely, a single driver may drive multiple different vehicles. Thus, vehicle driving data and/or accident records collected by vehicle-based systems might not include the vehicle occupants that correspond to the collected driving and accident data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for receiving telematics data (e.g., vehicle operation data, driver data, environmental data, etc.) associated with one or more vehicles from one or more mobile devices respectively disposed within the one or more vehicles. Telematics data may include, for example, a geographic location of the first vehicle, a route being traversed by the first vehicle, driving events or maneuvers (e.g., braking, turning, accelerating) performed by the first vehicle, corresponding timestamps or timeframes, etc. In some instances, the telematics data may include sensor data from various sensors operationally coupled to the first vehicle and configured to sense the immediate surroundings of the vehicle. A camera may be associated with the first vehicle for capturing a driving event performed by a second vehicle in proximity to the first vehicle. An evaluation module may evaluate the captured video, with or without analyzing the telemetry data, to determine whether a driving event performed by a second vehicle has occurred and assign, in response to an identified driving event performed by the second vehicle, a first driving event rating to a video showing the identified driving event. The video may then be posted to a social network to obtain a crowd-sourced driving event rating, which may then be compared to the first driving event rating to determine an incentive to be awarded to the person who captured the video based on the comparison.

In some cases, a vehicle may include a camera associated with the vehicle and having a viewing angle capable of capturing a video of one or more other vehicles in proximity to the vehicle and a telemetry device in communication with at least sensor capturing data associated with the operation of the vehicle. A first memory device may be communicatively coupled to the camera, wherein the first memory location stores raw video data captured by the camera. A second memory device may be communicatively coupled to the first memory device, the second memory device storing a driving event video comprising a video recording of a second vehicle performing a driving event. The vehicle may include a personal computing device that may be detachably coupled to the vehicle, such as the mobile device 218 that may be installed in a hands-free cradle. The evaluation module may include a processor executing instructions that cause the processor to evaluate the raw video stored in the first memory location to determine whether a driving event performed by a second vehicle has occurred, store at least a portion of the raw video in the second memory location as the driving event video, and assign a driving event rating to the driving event video showing the identified driving event.

In some examples, a method may include capturing, by a camera associated with a first vehicle, a video showing a driving event performed by a second vehicle, wherein the driving event causes a situation dangerous to other vehicles in proximity to the second vehicle, assigning a driving event rating to the video by a person who captured the video, wherein the rating quantifies a perceived danger to the other vehicles in proximity to the second vehicle, posting, via a communication network, the video to a social network to obtain a crowd-sourced driving event rating for the video, and generating, by an event analyzer, a composite driving event rating to the video based on the rating assigned by the person who captured the video and the crowd-sourced driving event rating.

In accordance with further aspects of the present disclosure, a computing device may determine a vehicle rating based a plurality of driving event ratings associated with the vehicle, where the vehicle rating may be published to provide information to drivers when a potentially dangerous vehicle is near Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
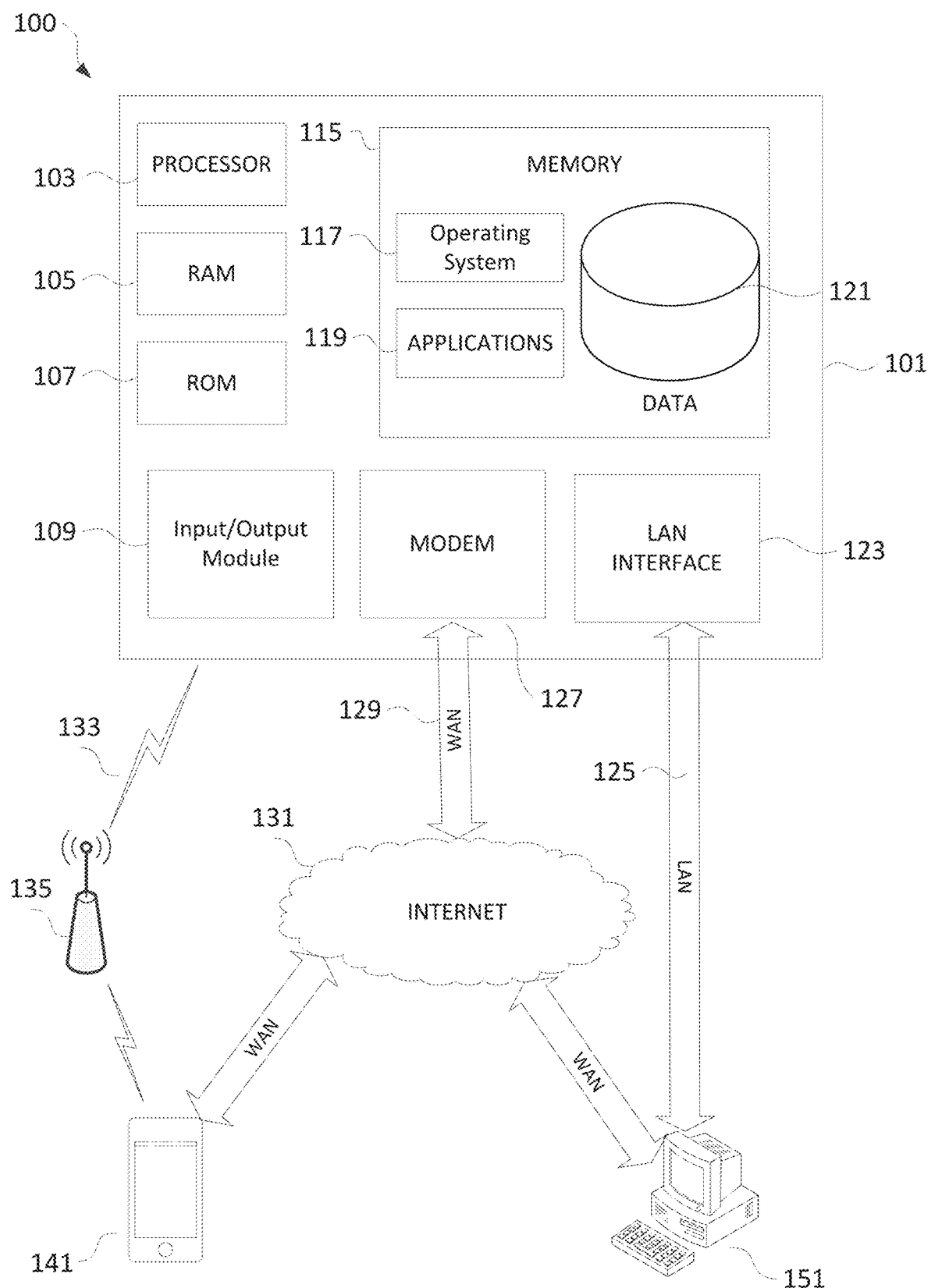
FIG. 1 depicts an illustrative network environment and computing systems that may be used to implement aspects of the disclosure.

FIG. 1 illustrates a block diagram of a computing system (or computing device) 101 in a communication system 100 that may be used according to one or more illustrative embodiments of the disclosure. The computing system 101 may have a processor 103 for controlling overall operation of the computing system 101 and its associated components, including a RAM 105, a ROM 107, an input/output module 109, and one or more memory devices 115. The computing system 101, along with one or more additional devices (e.g., the terminals 141, 151) may correspond to any of multiple systems or devices, such as a driving analysis server or system, configured as described herein for receiving and analyzing vehicle driving data and calculating driver scores based on identified driving events.

The Input/Output (I/O) 109 may include one or more devices, such as a microphone, keypad, touch screen, a stylus, etc., through which a user of the computing system 101 may provide input, and may also include one or more of a speaker for providing audio output and a video display device for providing textual, audiovisual and/or graphical output. Software may be stored within the one or more memory devices 115 and/or storage to provide instructions to the processor 103 for enabling the computing system 101 to perform various functions. For example, the one or more memory devices 115 may store software used by the computing system 101, such as an operating system 117, application programs 119, and an associated internal database 121. The processor 103 and its associated components may allow the computing system 101, such as a driving analysis computing system, to execute a series of computer-readable instructions to receive a video showing a driving event of a third-party vehicle, receive grading information from the driver providing the video, receive driving data from the vehicle, verify the driving event based on the driving data and/or the video of the driving event, receive image data, video data, and/or object proximity data associated with the driving event, perform an analysis of the driving event based on image data, video data, and/or object proximity data, provide the video for viewing by a plurality of viewers via a social network, receive grading information associated with the driving event by the plurality of users, and determine a reward or other incentive to be provided to the individual in response to providing and grading the video.

The computing system 101 may operate in a networked environment, such as the communication system 100, supporting connections to one or more remote computers, such as the terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the computing system 101. The network connections depicted in FIG. 1 may include a local area network (LAN) 125, a wide area network (WAN) 129, and/or a wireless telecommunications network 133, but may also include other networks. When used in a LAN networking environment, the computing system 101 may be connected to the LAN 125 through a network interface or adapter 123. When used in a WAN networking environment, the computing system 101 may include a modem 127 or other means for establishing communications over the WAN 129, such as the network 131 (e.g., the Internet). When used in a wireless telecommunications network 133, the computing system 101 may include one or more transceivers, digital signal processors, and additional circuitry and software for communicating with wireless computing devices (e.g., the terminals 141, 151, mobile phones, vehicle telematics devices, etc.) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the computing system 101 may include computer executable instructions (e.g., driving analysis programs, pattern identification, video analysis programs, analysis algorithms, and/or driver score algorithms) for receiving a video showing a driving event of a third-party vehicle, receiving grading information from the driver providing the video, receiving driving data from the vehicle, verifying the driving event based on the driving data and/or the video of the driving event, receiving image data, video data, and/or object proximity data associated with the driving event, performing an analysis of the driving event based on image data, video data, and/or object proximity data, providing the video for viewing by a plurality of viewers via a social network, receiving grading information associated with the driving event by the plurality of users, and determining a reward or other incentive to be provided to the individual in response to providing and grading the video, and performing other related functions as described herein.

As used herein, a vehicle score (e.g., a vehicle rating, a driving rating, etc.) may refer to an evaluation of perceived driving abilities, safe driving habits, and other driver information obtained regarding a third-party vehicle encountered on the road. An event score may refer to an evaluation of perceived driving abilities, safe driving habits, and other driver information obtained regarding a driving event associated with the third-party vehicle encountered on the road. For example, an insurance provider (or other business organization) may incentivize a customer to provide and/or rate video of driving events of third party vehicles as witnessed on the road. The video may then be published via a social network for viewing and/or rating by a plurality of event viewers. In some cases, the insurance provider may evaluate the driving events captured on the video using a driving event evaluation system, where the video footage may be analyzed, with our without additional driving data, to determine an event score for the driving event. In some cases, the event scores provided by the customer and/or each of the plurality of event viewers, may be aggregated, normalized or otherwise evaluated. In some cases, the vehicle score may be assigned to the third-party vehicle based on one or more event scores, where the event scores may be generated by the customer witnessing one or more driving events, one or more viewers of the driving events via a social network, and/or the insurance provider's determined event score. In some cases, the insurance provider may use the videos, the event scores, and/or the vehicle scores to perform insurance analysis and determinations (e.g., determine premiums and deductibles incentives, award rebates based on a rating ability, determine incentives based on a quantity of videos provided, etc.) and/or to generate educational materials (e.g., videos, quizzes, interactive presentations, etc.) identifying dangerous driving events and/or instructing drivers about how to avoid situations in which such driving events may occur.

In some cases, the ability of the customer and/or each of the plurality of video viewers may be assigned a reviewer score. The reviewer score may be used to quantify the ability of each individual (e.g., the customer, a viewer, the insurance provider) to provide an accurate rating of a driving event. The reviewer score may correspond to a correlation between the viewer's rating and a rating provided by the one or more other viewers and/or the driving event evaluation system. For example, a viewer may be given a higher reviewer score (e.g., 10 of 10, 9 of 10, 8 of 10, 7 of 10, etc.) based on a higher correlation between the viewer's rating and the other ratings of the event. Similarly, the viewer may be given a lower reviewer score (e.g., 0 of 10, 1 of 10, 2 of 10, 3 of 10, etc.) based on a lower correlation between the viewer's rating and the other ratings of the event. In many cases, the insurance provider, such as by using the driving event evaluation system, may periodically calculate the reviewer score for each customer who provides videos of driving events. In some cases, the driving event evaluation system may use additional information, such as telematics information, vehicle performance information, vehicle sensor information, traffic information, weather information, and the like when generating one or more of the event score, the vehicle score, and/or the reviewer rating.

It should be understood that an event score, as used herein, may be associated with an individual, group of individuals, or a vehicle. For instance, a family, group of friends or co-workers, or other group that shares a vehicle, may have a single vehicle score that is shared by the group. Additionally, a vehicle score associated with a vehicle may have one or more associated event scores that may be generated by one or more primary drivers of the vehicle and may be affected by the driving behavior of any the vehicle's drivers. In other examples, a vehicle may be configured to identify different drivers, and each driver of the vehicle may have a separate event score and/or vehicle score.

Figure 2:
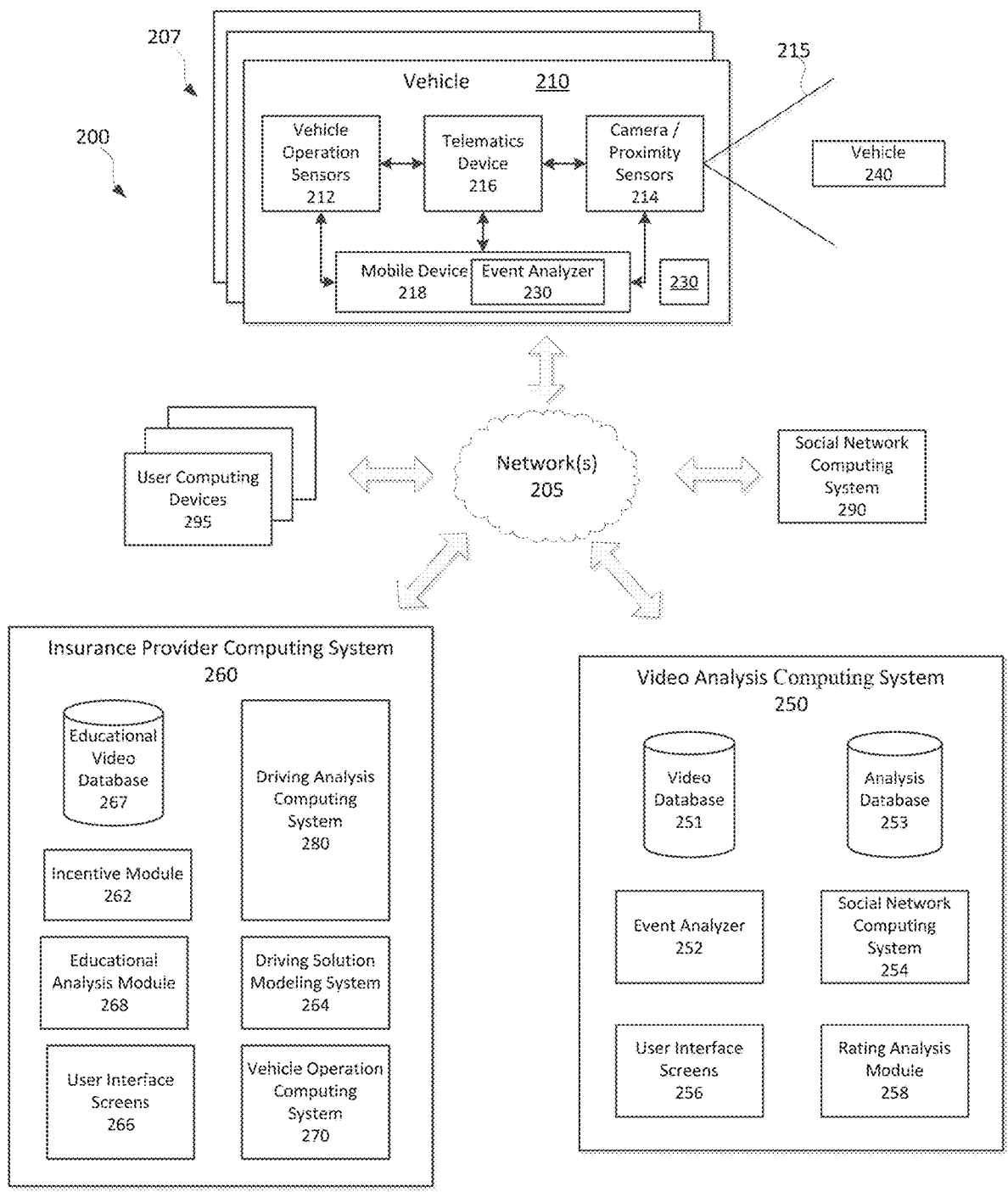
FIG. 2 depicts a block diagram of an illustrative driving event analysis system, according to one or more aspects of the disclosure.

FIG. 2 shows a block diagram of an illustrative driving event analysis system 200 according to aspects of the present disclosure. Each component shown in FIG. 2 may be implemented in hardware, software, or a combination of hardware and software. Additionally, each component of the driving analysis system 200 may include a computing device (or system) having some or all of the structural components described above for the computing system 101. The illustrative driving event analysis system 200 may include a plurality of vehicles 207, such as vehicle 210, in the presence of a third-party vehicle 240. For example, the vehicles 207, 210 and 240 may all be near a same geographic location on a roadway. The vehicles 207 may belong to customers of a business organization, such as an insurance company, where drivers and/or owners of the vehicles may be enrolled in a program to capture and provide ratings of driving events encountered while operating the vehicles 207, 210. In some cases, one or more devices associated with the vehicles 207, 210 may be in communication with one or more other computing systems via a wired and/or wireless communications network (e.g., network 205). Information, such as videos of driving events, information associated with the vehicles 207, 210, 240, and or the like, may be communicated from the vehicles 207, 210, 240 to one or more other computer systems for further analysis. For example, a video and associated information may be communicated via the network 205 to a video analysis computer system 250 and/or an insurance provider computer system 260. The video analysis computer system may analyze the video and any associated information to determine a rating associated with an identified driving event and/or the vehicle 240. The video may be provided for viewing by other individuals (e.g., insurance provider customers, members of the public, etc.) via one or more social networks (e.g., a private social network 254, a public social network 290, etc.). The insurance provider computer system 260 may include one or more computing systems and/or modules for analyzing insurance policy information when determining incentives and/or rewards to be awarded to drivers and/or owners who choose to capture video of driving events associated with other vehicles 240. For example, the insurance provider computer system may include an educational video database 267, a driving analysis computing system 280, a driving solution modeling system 264, and a vehicle operation computing system 270, an incentive module 262, an educational analysis module 268, and/or one or more user interface screens 266.

The driving event analysis system 200 shown in FIG. 2 may include a vehicle 210, such as an automobile, motorcycle, truck, scooter, boat, or other vehicle for which a driving event data analysis may be performed and for which a driver score may be calculated. For example, the driving event analysis system may be used to evaluate driving events encountered on the road (e.g., for automobiles, trucks, motorcycles, scooters, etc.), for driving events encountered on the water (e.g., for boats, personal water craft, etc.), and/or in the air (e.g., for airplanes, helicopters, etc.). The vehicle 210 may include vehicle operation sensors 212 capable of detecting and recording telematics data (e.g., various conditions at the vehicle and operational parameters of the vehicle). For example, sensors 212 may detect and store data corresponding to the vehicle's speed, distances driven, rates of acceleration or braking, and specific instances of sudden acceleration, hard braking, hard turning, and swerving. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems, such as an onboard diagnostic (OBD) system.

Additional sensors 212 may detect and store the external driving conditions, which may also be referred to herein as telematics data, (for example, external temperature, rain, snow, light levels, and sun position for driver visibility). Sensors 212 also may detect and store telematics data relating to moving violations and the observance of traffic signals and signs by the vehicle 210. Additional sensors 212 may detect and store telematics data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and/or proximity sensors 214 capable of recording additional conditions inside or outside of the vehicle 210, which may also be referred to herein as telematics data. For example, internal cameras 214 may detect conditions such as the number of the passengers in the vehicle 210, and potential sources of driver distraction within the vehicle (e.g., pets, phone usage, and unsecured objects in the vehicle). External cameras and proximity sensors 214 may detect other nearby vehicles, traffic levels, road conditions, traffic obstructions, animals, cyclists, pedestrians, and other conditions that may factor into a driving event data analysis. In some cases, the vehicle 210 may include cameras and/or proximity sensors 214 integrated into the mechanical systems of the vehicle, either by the manufacturer of the vehicle or by installing after-market camera and/or proximity sensor systems. In some cases, the cameras and/or proximity sensors 214 may include a mobile device associated with a driver of the vehicle 210 (e.g., a mobile phone, a global positioning system (GPS) device, a laptop, etc.) that may include one or more cameras and/or sensors that may be used for gathering information used to capture and/or to evaluate a driving event.

The operational sensors 212 and the cameras and proximity sensors 214 may store data within the vehicle 210, and/or may transmit the data to one or more external computer systems (e.g., a video analysis computing system 250, an insurance provider computing system 260, a vehicle operation computer system 270 and/or a driving analysis server 280). As shown in FIG. 2, the operation sensors 212, and the cameras and proximity sensors 214, may be configured to transmit data to a vehicle operation computer system 225 via a telematics device 216 and/or a mobile device 218. In some cases, one or more of the operation sensors 212 and/or the cameras and proximity sensors 214 may be configured to transmit data directly without using a telematics device 216 and/or the mobile device. For example, telematics device 216 may be configured to receive and transmit data from operational sensors 212, while one or more cameras and proximity sensors 214 may be configured to directly transmit data to the video analysis computing system 250 or the insurance provider computing system 260 without using the telematics device 216. Thus, telematics device 216 may be optional in certain examples where one or more sensors or cameras 212 and 214 within the vehicle 210 may be configured to independently capture, store, and transmit vehicle operation and driving data.

The telematics device 216 may be a computing device containing many or all of the hardware/software components as the computing system 101 depicted in FIG. 1. As discussed above, the telematics device 216 may receive vehicle operation and driving data (e.g., telematics data) from the vehicle sensors 212, the cameras and/or proximity sensors 214, and may transmit the telematics data to one or more external computer systems (e.g., a vehicle operation computer system 225 and/or a driving analysis server 220) over a wireless transmission network 205 (e.g., the Internet, a cellular communications network, etc.). The telematics device 216 also may be configured to detect or determine additional types of telematics data relating to real-time driving and the condition of the vehicle 210. In certain embodiments, the telematics device 216 may contain or may be integral with one or more of the vehicle sensors 212 and cameras and proximity sensors 214 discussed above, and/or with one or more additional sensors discussed below.

In some cases, the condition and/or attention of the driver of the vehicle 210 may be relevant to whether or not the driver has correctly identified a driving event of the other vehicle 240. As such, the telematics device 216 may be configured to collect telematics data regarding the number of passengers and the types of passengers (e.g. adults, children, teenagers, pets, etc.) in the vehicle 210. The telematics device 216 also may be configured to collect telematics data indicating a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer. If the driver's condition and/or attention is diverted from the road, the driver may incorrectly identify or miss a driving event associated with the other vehicle 240. This information may be used by an external computing system, such as the video analysis computing system 250 and/or the insurance provider computing system when evaluating a video of a reported driving event associated with the vehicle 240.

In some cases, the location of the vehicle 210 may be useful in generating an event rating and/or vehicle rating to be associated with the vehicle 240. For example, the location of the vehicle 210 may be used to obtain information about the weather and/or traffic during a time period near a time of an identified driving event of the vehicle 240. In some cases, the telematics device 216, the mobile device 218 or a separate personal global positioning device may collect telematics data regarding the driver's route choice, whether the driver follows a given route, and/or to classify the type of trip (e.g. commute, errand, new route, etc.). In certain embodiments, the telematics device 216 may be configured to communicate with the sensors 212 and/or cameras and/or proximity sensors 214 to determine when and how often the vehicle 210 stays in a single lane or strays into other lanes. To determine the vehicle's route, lane position, and other data, the telematics device 216 and/or the mobile device may include or may receive data from one or more of a mobile telephone, a Global Positioning System (GPS), a locational sensor positioned inside a vehicle, or a locational sensor (e.g., a roadside positional sensor) or other device remote from the vehicle 210.

The telematics device 216 and/or mobile device 218 may store the identification information of the vehicle 210, that may include a vehicle identification number, the make, model, trim (or sub-model), year, and/or engine specifications. The identification information may be programmed into the telematics device 216 by a user or customer, determined by accessing a remote computer system, such as an insurance company or financial institution server, or may be determined from the vehicle itself (e.g., by accessing the vehicle's 210 computer systems). The identification information may be associated with any video communicated to a remote network.

The vehicle 210 also may include a personal mobile device 218 containing a number of software and hardware components. A personal mobile device 218 may be located within a vehicle 210, such as a driver's or passenger's smartphone, tablet computer, laptop computer, or other personal mobile device. As used herein, a mobile device 218 "within" a vehicle 210 refers to a mobile device 218 that is inside of or otherwise secured to a moving vehicle, for instance, mobile devices 218 in the cabins of automobiles, buses, recreational vehicles, mobile devices 218 traveling in open-air vehicles such as motorcycles, scooters, or boats, and mobile devices 218 in the possession of drivers or passengers of vehicles 210. Mobile devices 220 may be, for example, smartphones or other mobile phones, personal digital assistants (PDAs), tablet computers, and the like, and may include some or all of the elements described above with respect to the computing system 101.

A mobile device 218 may be configured to establish communication with one or more vehicle-based devices (e.g., sensors, on-board vehicle computing devices, etc.) and various internal components of vehicle 210 via wireless networks or wired connections (e.g., for docked devices), whereby such mobile devices 218 may have secure access to internal vehicle the sensors 212, the camera/proximity sensors 214 and other vehicle-based systems. However, in other examples, the mobile device 218 might not connect to vehicle-based computing devices and internal components, but may operate independently by communicating with the vehicle 210 via standard communication interfaces (e.g., short-range communication systems, telematics devices 216, etc.), indirectly through external networks, and servers, or might not communicate at all with the vehicle 210.

The mobile device 218 may include a network interface, which may include various network interface hardware (e.g., adapters, modems, wireless transceivers, etc.) and software components to enable the mobile device 218 to communicate with external servers (e.g., the video analysis computing system 250), one or more vehicles such as the vehicle 210, and/or various other external computing devices. One or more specialized software applications, such as a telematics data acquisition application or an event analyzer 230 may be stored in the memory of the mobile device 218, a vehicle computing system (e.g., an on-board computing system), or the like. In some cases, the event analyzer, or a portion of the event analyzer functionality may be located in a computer system separate from the mobile device, such as the video analysis computing system 250, the insurance provider computing system, and the like. Application(s) may be received via a network interface from one or more external computing systems, such as the video analysis computing system 250, the insurance provider computing system 260, the driving analysis computing system 280, the vehicle operation computing system 270, one or more vehicles (e.g., the vehicle 210), or other application providers (e.g., a public or a private application store). Certain applications might not include user interface screens, while other applications may include user interface screens that support user interaction. Such applications may be configured to run as user-initiated applications or as background applications. The memory of mobile device 218 also may include databases configured to receive and store video data, driving event data, vehicle data, driver or passenger data, insurance data, and the like, associated with one or more drivers and/or vehicles. Although this section describes various software application(s) as executing on mobile devices such as the mobile device 218, in various other examples, some or all of the functionality described herein may be implemented within the vehicle 210, via specialized hardware and/or software applications within a vehicle-based system, such as software within a telematics device 216 or a vehicle control computer, etc.

In some cases, the event analyzer 230 may be configured to analyze information received from one or more sources (e.g., the vehicle operation sensors, the telematics device, the camera and/or proximity sensors 214) to determine whether a driving event associated with another vehicle 240 has occurred. The event analyzer 230 may include an input/output device (e.g., a keyboard, a microphone, a touchscreen display, an LCD display, etc.) that may be used by a driver or passenger in the vehicle 210 to provide additional information regarding a perceived driving event. In an illustrative example, the event analyzer 230 may be configured to receive video input from a video camera associated with the vehicle 210. The camera 214 may be configured to capture video within a field of view from the vehicle (e.g., to the front, to the side(s), to the rear, etc.). The video may be captured and stored locally in a temporary memory location until a driving event has been identified, either automatically such as by the event analyzer or in response to an input received from a user within the vehicle 210. For instance, a plurality of vehicles 207, 240 may be driving on a roadway and a third-party vehicle 240 may be driving near the vehicle 210 within the field of view 215 of the camera 214. The camera 214 may be configured to take video and record continuously or nearly continuously to minimize a possibility that a driving event may be missed. To conserve memory, the camera 214 may be configured to record a pre-specified amount of video (e.g., about 1 minute, about 2 minutes, about 3 minutes, about 5 minutes, etc.) in a video recording memory area before the oldest portion is lost. In some examples, the camera 214 may be configured to store the last minute (e.g., two minutes, three minutes, etc.) of video. When something of interest happens, the driver or passenger of the vehicle 210 may trigger the camera to save the video. For example, when a driving event is recognized by the event analyzer 230, such as by receiving a user input or automatically identifying the driving event using a video analysis algorithm, the event analyzer 230 may determine transfer at least a portion of the video to be transferred to a video processing memory area for further analysis. The video recording memory area and the video processing memory area may be included in one or more of the camera 214, the mobile device 218 and the event analyzer 230. In other cases, the event analyzer 230 may communicate the video to a remote device via a network 205 (e.g., a cellular communications network, a WiFi communications network, the Internet, etc.) for additional processing. In an illustrative example, the camera 214 may communicate the stored video, in response to an identified driving event, to an external computing system (e.g., a cloud storage system, the insurance provider computing system 260, the video analysis computing system 250, etc. In some cases, the video data may be associated with other information, such as time of day information, location information, vehicle operation information, telematics information, V2V information (e.g., information about the vehicle 240 such as vehicle identification information), weather information, road condition information and the like.

Like the vehicle-based computing devices in vehicles 210, the mobile device 218 also may include various components configured to sense (e.g., generate or acquire) telematics data (e.g., geographic location, heading, route, linear velocity, angular velocity, acceleration, deceleration, driver data, weather data, and/or other telematics data discussed herein) and transmit the telematics data or other relevant data to video analysis computing system 250 for identification of driving events and/or determining an event score and/or a vehicle score as discussed in further detail below. For example, using data from movement sensors (e.g., 1-axis, 2-axis, or 3-axis accelerometers, compasses, speedometers, vibration sensors, gyroscopic sensors, etc.) and/or GPS receivers or other location-based services (LBS), an application of mobile device 218 may determine that the mobile device 218 is in a moving vehicle, that a driving trip has started or stopped, has made a sudden movement such as to brake or swerve to avoid a hazard and/or that a vehicle accident has occurred. The movement sensors and/or GPS receiver or LBS component of the mobile device 218 may also be used to determine other information such as driving speeds, routes, accident force, and angle of impact, and other accident characteristics and accident-related data.

The vehicle 210 and the personal mobile device 218 may communicate with each other via wireless networks or wired connections (e.g., for devices physically docked in vehicles), and each may communicate with one or more additional vehicles 207, additional mobile computing devices, and/or a number of external computer servers (e.g., driving analysis server 220) over one or more communication networks (e.g., cellular communication network, WiFi communication network, etc.). The sensor data also may be transmitted from the vehicle 210 via a telematics device 216 or other network interface(s) to one or more remote computing devices, such as one or more personal mobile devices (e.g., the mobile device 218) and/or external servers (e.g., the video analysis computing system 250). For example, the mobile computing device 218 may transmit video information telematics data, driver data, vehicle data (e.g., braking, linear acceleration, angular velocity, etc.), directly to the video analysis computing system 250, and thus may be used in conjunction with or instead of telematics devices 216. Additionally, the mobile computing device 218 (and/or telematics device 216) may be configured to perform the vehicle-to-vehicle (V2V) and vehicle-to-infrastructure (V2I) communications, by establishing connections and transmitting and/or receiving telematics data to and from other nearby vehicles. Thus, the mobile computing device 218 (and/or telematics device 216) may be used in conjunction with, or instead of, a short-range communication system. In addition, the mobile computing device 218 may be used in conjunction with the vehicle control computers for purposes of vehicle control and diagnostics.

An illustrative short-range communication system may be a vehicle-based data transmission system configured to transmit various information (e.g., an electronic vehicle identification number (VIN), driving data, vehicle data, insurance data, driver and passenger data, etc.) to other nearby vehicles, and/or to receive corresponding data from other nearby vehicles. In some examples, communication systems may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The V2V transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles 210 (e.g., transceivers, antennas, etc.), while in other examples the communication systems may be implemented using existing vehicle hardware components (e.g., radio and satellite equipment, navigation computers) and/or may be implemented by software running on the mobile devices 218 of drivers and passengers within the vehicles 210.

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. The range of V2V communications and V2I communications may depend on the wireless communication standards and protocols used, the transmission/reception hardware (e.g., transceivers, power sources, antennas), and other factors. Short-range V2V (and V2I) communications may range from just a few feet to many miles, and different types of telematics data and characteristics may be determined depending on the range of the V2V communications.

Vehicle operation computer system 270 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210 and similar vehicle operation data from one or more other vehicles 207, 240. For example, the vehicle operation computer system 270 includes a vehicle operation database that may be configured to store the vehicle operation data collected from the vehicle sensors 212, proximity sensors and cameras 214, and telematics devices 216 of a plurality of vehicles. The vehicle operation database 227 may store operational sensor data, proximity sensor data, camera data (e.g., image, audio, and/or video), location data, and/or time data associated with multiple vehicles 207, 2210, and 240. In some cases, this information may be used by the video analysis computing system when analyzing videos of driving events associated with the vehicle 240.

Data stored in the vehicle operation database may be organized in any of several different manners. For example, a table in the vehicle operation database may contain all of the vehicle operation data for a specific vehicle 210, similar to a vehicle event log. Other tables in the vehicle operation database may store certain types of data for multiple vehicles. For instance, tables may store specific driving behaviors (e.g., driving speed, acceleration and braking rates, swerving, tailgating, use of seat belts, turn signals or other vehicle controls, etc.) for multiple vehicles 210 at specific locations, such as specific neighborhoods, roads, or intersections. Vehicle operation data may also be organized by time, so that the driving events or behaviors of multiple vehicles 207, 210, 240 may be stored or grouped by time (e.g., morning, afternoon, late night, rush hour, weekends, etc.) as well as location.

The insurance provider computer system 260 may include a driving analysis computing system 280, containing some or all of the hardware/software components as the computing system 101 as depicted in FIG. 1. The driving analysis computing system 280 may include hardware, software, and network components to receive vehicle operation data from the vehicle operation computer system 270 and/or directly from a plurality of vehicles 207, 210 and/or a plurality of mobile devices (e.g., the mobile device 218) respectively disposed within the plurality of vehicles. The driving analysis computing system 280 and the vehicle operation computer system 270 may be implemented as a single server/system, or may be separate servers/systems. In some examples, the driving analysis computing system 280 may be a central server configured to receive vehicle operation data from a plurality of remotely located vehicle operation computer systems 270.

In an illustrative example, the driving analysis computing system 280 may include a driving analysis module and a driver score calculation module that may be implemented in hardware and/or software configured to perform a set of specific functions within the driving analysis computing system 280. For example, the driving analysis module and the driver score calculation module may include one or more driving event analysis/driver score calculation algorithms, driving pattern determination and comparison algorithms, which may be executed by one or more software applications running on generic or specialized hardware within the driving analysis computing system 280. The driving analysis module may use the vehicle operation data received from the vehicle operation computer system 270 and/or additional image data, video data, and/or object proximity data to perform driving event analyses for the vehicle 210. The driver score calculation module may use the results of the driving event analysis performed by module to calculate or adjust a driver score for a driver of a vehicle based on specific driving events. Further descriptions and examples of the algorithms, functions, and analyses that may be executed by the driving analysis server are described in co-pending application "Context Based Grading" filed on Mar. 25, 2016 as U.S. patent application Ser. No. 15/081,135, included herein in its entirety. Such information regarding the driver of the vehicle 210 may be communicated and/or used by the video analysis computer system 250 when evaluating a driving event captured by the driver of vehicle 210 regarding the other vehicle 240. For example, such information may be used to determine whether an action performed by the driver of the vehicle 210 may have caused by, been influenced by and/or otherwise had an effect on a particular driving event captured on video by the camera 214.

To analyze a driving event video and/or perform other actions using the video and other information communicated from the vehicle 210, the driving analysis computing system 280 and/or the video analysis computing system 250 may initiate communication with and/or retrieve data from one or more mobile devices, one or more vehicles 210, the vehicle operation computer system 270, and one or more additional computer systems storing data that may be relevant to the driving event analyses, driver score calculations, and/or event rating calculations. For example, one or more traffic data storage systems, such as traffic databases, may store data corresponding to the amount of traffic and certain traffic characteristics (e.g., amount of traffic, average driving speed, traffic speed distribution, and numbers and types of accidents, etc.) at various specific locations and times. The traffic data storage systems also may store image and video data recorded by traffic cameras various specific locations and times. One or more weather data storage systems, such as weather databases, may store weather data (e.g., rain, snow, sleet, hail, temperature, wind, road conditions, visibility, etc.) at different locations and different times. One or more additional driving databases/systems may store additional driving data from one or more different data sources or providers which may be relevant to the driving event analyses, event rating calculations, and/or driver score calculations. Additional driving databases/systems may store data regarding events such as road hazards and traffic accidents, downed trees, power outages, road construction zones, school zones, and natural disasters that may affect the driving event analyses, event rating calculations and/or driver score calculations performed by the driving analysis server 220 and/or the video analysis computing system 250. In an illustrative example, the driving analysis driving analysis computing system 280 may retrieve and use data from these databases to analyze and evaluate the driving events captured in video of the camera of the vehicles 210.

The video analysis computing system 250 may be communicatively coupled to the vehicle 210 and/or the mobile device 218 via the network 205. For instance, the video analysis computing system 250 may receive video, and other associated information, regarding driving events captured by the camera 214 of the vehicle 240. This information may be stored in one or more memory locations, such as the video database 251 and/or the analysis database 253. In an illustrative example, the video database may store a driving event video linked, or otherwise associated with, other information corresponding to the driving event. For instance, this associated information may include a time of the event, geographic location information, information about the driver and/or owner of the vehicle 210 (e.g., insurance policy information, a name, an identification number, etc.), vehicle identification information (e.g., an electronic VIN, a full or partial image of a license plate, a full or partial image of a driver, etc.), vehicle operation information (e.g., a speed, an oil pressure, acceleration information, etc.), weather information, traffic information, and/or the like. In some cases, the associated information may include an identification of the driving event captured on video, by the driver and/or a passenger of the vehicle 210. This identification may further include information about activities and/or locations of the vehicles 207, 210, 240 in relation to each other during times before and/or after the captured driving event.

The event analyzer 252 may be the same as, or different than the event analyzer 230 of the mobile device 218. The event analyzer 252, like the event analyzer 230, may include one or more event analysis and/or event rating algorithms, which may be executed by one or more software applications processed by a processor of the video analysis computing system 250. In an illustrated example, the event analyzer may analyze the video using video processing algorithms to identify the vehicle of interest (e.g., vehicle 240) in relation to one or more reference points, such as a fixed reference point (e.g., a horizon line, a lane marker, a roadside object, etc.) and/or a relative reference point (e.g., a point of the vehicle 210, a location of one or more other vehicles 207, etc.). Once determined, the event analyzer 252 may process the vehicle operation information, along with the video image, to determine a trajectory of the vehicle 240 during the identified driving event. Using this trajectory, the event analyzer may compare the determined trajectory to trajectories associated with known driving events to associate the captured driving event with a particular driving event classification (e.g., hard braking, hard turning, excessive speeding, swerving, improper signaling, tailgating, collisions, and/or the like). For example, a trajectory of the vehicle 240 during a hard braking event is different than a trajectory of the vehicle 240 operating at an excessive speed or while tailgating another vehicle. This trajectory based algorithm is merely an illustrative example, and other such driving event determination algorithms may be implemented by the event analyzer. For instance, using the video and associated information, the event analyzer 252 may calculate motion information (e.g., a velocity, a position and/or an acceleration, etc.) of the vehicle 240 in relation to the vehicle 210 based on the velocity, location and/or acceleration information determined using the vehicle operation sensors 212, along with other telematics information.

Once the event analyzer determines a driving event classification of the captured driving event, the video analysis computing system 250 may determine an event rating to be associated with the driving event by the event analysis module 258. In some cases, the event rating may be assigned as a letter grade (e.g., A-F, etc.), a numerical grade (e.g., 1-10, 1-100, etc.), and/or the like. This event rating may be used to represent a severity of the driving event that may be representative of a danger posed by the vehicle 240 to its driver, other vehicles 207, 210 and/or others in the vicinity (e.g., pedestrians). For example, a tailgating event identified for a vehicle 240 identified as travelling at a high rate of speed in heavy traffic may receive a letter grade of E or F (or a numerical grade of 9 or 10), while a similar tailgating event for the vehicle 240 identified travelling at a low rate of speed with minimal traffic may receive a different letter rating of C or D, or a numerical rating of 6 or 7. In some cases, a driving event may be identified as a positive driving event (e.g., a correct use of a turn signal, pulling to the side of the road for an emergency vehicle, etc.) may be identified by the driver of the vehicle 210. In such cases, these positive driving events may receive a letter rating of A or B, or a numerical rating of 1 or 2.

The rating analysis module 258 may utilize video information and/or other information associated with a video of a particular driving event when calculating the event rating. In some cases, the driving event may use a numerical algorithm to calculate the event rating. For example, a sample algorithm may be written as:

$$\text{(event rating)} = a^*(\text{driving event value}) + b^*(\text{vel}) + c^*(\text{accel}) + d^*(\text{traffic value}) + \ldots;$$

where a, b, c, and d are multipliers and driving event value, vel, accel, traffic value, are numerical values associated with the information associated with a driving event. For example, driving event value may correspond to a relative severity of the particular driving event, where a more severe driving event (e.g., tailgating at a high rate of speed in heavy traffic) has a higher starting value (e.g., about 70) than a less severe driving event (e.g., tailgating at a lower rate of speed in minimal traffic) has a lower starting value (e.g., 35). Similarly, the values of (vel) and (accel) may be an actual velocity or acceleration value and (traffic value) may be related to a traffic density, where a higher traffic density corresponds to a higher number. The resulting event rating may be scaled or otherwise converted to a desired event rating that may be presented to users via one or more user interface screens 256, viewers of a social network 254, 290 and/or used by the insurance provider computing system 260 in generating educational material and/or determining an incentive to be awarded to the customer who captured the video of the driving event.

In some cases, multiple vehicles 207 may capture videos, or other information, of the same driving event, and/or multiple driving events associated with the same vehicle. The video analysis computing system 250 may be configured to aggregate event ratings associated with the same driving event based on the videos and other information communicated from the vehicles 207. For example, the ratings analysis module 258 may compute an average, median or other combination (e.g., a weighted average based on the rating expertise of each customer providing the videos, etc.) of the individual event ratings associated with each of the videos. The combined rating may then be used as the event rating, be used to adjust the automatically generated rating, or adjust one or more equations used by the rating analysis module in generating an event rating. The rating analysis module may also generate a vehicle rating, by combining (e.g., averaging, a weighted combination of event ratings, etc.) a plurality of event ratings associated with the vehicle 240. For example, the vehicle rating may be combine ratings of a same driving event obtained from multiple vehicles and/or may combine ratings of two or more different driving events. In an illustrative example, a higher vehicle score (e.g., 9, 10, etc.) may correspond to a vehicle known to be associated with a plurality of driving events and a lower vehicle score may correspond to a vehicle associated with few, if any, identified driving events.

In some cases, the rating analysis module may include a learning algorithm that may be used to adjust the ratings and/or algorithms used in generating the event ratings and or vehicle ratings based on a comparison of ratings provided by the submitter of the video (e.g., the driver of the vehicle 210) and/or ratings provided by other viewers of the video via the social network 254, 290. In some cases, along with the vehicle ratings and the driving event ratings, the analysis database 253 may also be used to store one or more algorithms used in generating these ratings.

Once the videos of driving events have been received and/or analyzed by the video analysis computing system, the insurance provider may desire to post one or more of the videos to a social network 254, 290 to solicit additional ratings from viewers of the event. In some cases, the insurance provider post one or more videos to a private social network 254 that may be under the control of the insurance provider, or a business partner of the insurance provider. In such a way, the insurance provider may have a greater control over the accuracy of the ratings and/or control in allowing access to certain preferred individuals. In other cases, one or more of the plurality of videos may be posted to a public social network 290 (e.g., Twitter™, Facebook™, etc.) to allow access to a greater number of individuals via one or more user computing devices 290. In some cases, the private social network 254 may utilize one or more user interface screens 256 to present videos, solicit feedback, and/or receive ratings information from one or more individuals.

The insurance provider computing system 260 may be configured to generate one or more educational videos, or other educational information, for educating drivers about dangerous driving activities. In some cases, the videos received from the vehicles 207, 210 may be used in generating such educational materials. In an example, the educational analysis module 268 may be configured to access the video database 251, with or without using the information stored in the analysis database, to generate one or more educational videos that may then be stored in the educational video database. In an example, the educational analysis module 268 may identify a video based on a desired event rating (e.g., a higher rating, a lower rating, etc.), a desired driving event type (e.g., hard braking, swerving, improper lane usage, hard turning, etc.), or the like. Once identified, the educational analysis module may identify the vehicle 240 within the video performing the recorded driving event so that the driving solution modeling system 264 may construct a model of the actions of the driver of the vehicle 240 and/or to generate one or more solutions in which the driver of the vehicle 240 may have avoided the recorded driving event. In some cases, the driving solution modeling system 264 may process the video and the calculated driver model to generate one or more alternative trajectories for the vehicle 240 to travel so that the driving event may be minimized and/or avoided. Such alternative trajectories may be overlaid on the originally captured video, often in response to a user input received via one or more of the user interface screens 266.

The insurance provider computing system 260 may further include an incentive module 262 that may be used to generate an incentive for one or more customers of the insurance provider who choose to participate in an incentive-based program. For example, in return for the customer installing hardware and/or software, the insurance provider may generate, or otherwise provide an incentive. The customer may be incentivized to generate and/or rate videos of other vehicles 240 performing one or more driving events. These incentives may include a discount to an insurance premium, a rebate to a previously paid insurance premium, a predetermined amount of money per video, a predetermined number of reward points, and/or other rewards that may provide a reward, In some cases, the incentive module 262 may be used to adjust a determined incentive based on an ability to rate the video, an ability to generate the videos, a quality of the video, and the like.

Figure 3:
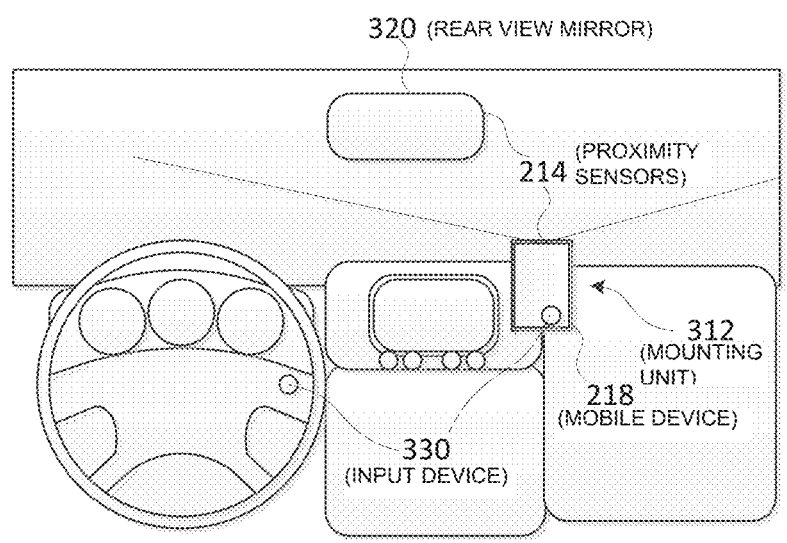
FIG. 3 depicts an illustrative block diagram of an interior space of a vehicle configured to obtain a video of another vehicle performing a driving event, according to one or more aspect of the disclosure.

FIG. 3 shows an illustrative block diagram showing a view from a perspective of a driver or passenger of the vehicle 210. When a customer chooses to participate in a driving event ratings program, the insurance provider, or partner organization, may provide or otherwise suggest hardware and/or software components that may be included in a vehicle 210 to enable to vehicle 210 to efficiently capture video images of driving events performed by another vehicle 240. For instance, the customer may install a camera 214 within the interior space (or exterior space) of the vehicle to provide the camera a sufficient view of at least a portion of the roadway. In some cases, the camera 214 may be an aftermarket part. In some cases, the camera 214 may be a camera installed on the vehicle 210 by a manufacturer. In some cases, the user, or insurance provider, may provide a mounting unit 312 for mounting a mobile device 218 within an interior space of the vehicle and with a view of at least a portion of the roadway. Here in FIG. 3, the cameras are shown facing forward; however other camera configurations may be used where the camera may be located to capture a portion of video out of a front window, out of a side window, and/or out a rear window of the vehicle 210. In some cases, a camera and/or a sensor (e.g., a proximity sensor, etc.) may be incorporated into the mobile device 214 or may be incorporated otherwise affixed to a portion of the vehicle, such as a rear view mirror 320. As discussed above, the camera 214 may have a field of view 315, where the camera 214 may generate a video of vehicles within the field of view. In some cases, a vehicle driver or passenger may use an input device 330 to identify when the driver identifies a driving event. For example, the driver may use the input device, such as a physical button installed on a vehicle surface. In other cases, the input device may be incorporated into the mobile device 218 or the vehicle computing system such as by using a touchscreen button. In some cases, the input device may include a microphone for receiving an audible input from a user.

Figure 4A:
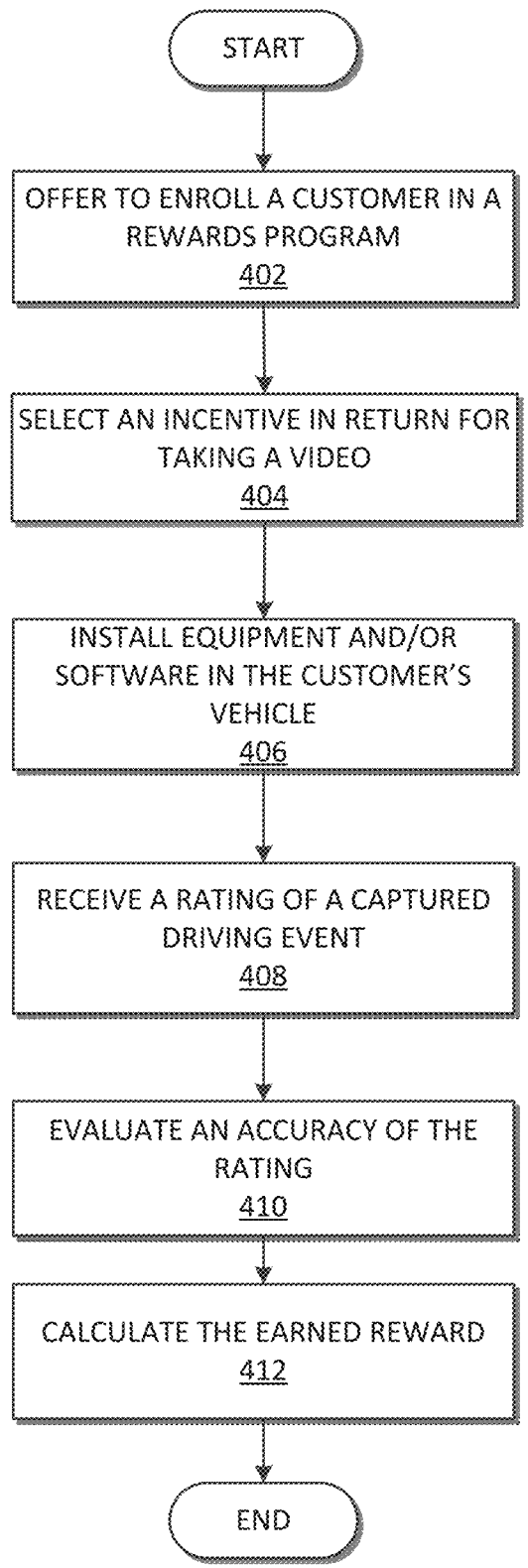
FIG. 4A depicts a flow diagram for an illustrative method of determining a reward for obtaining and rating a video of another vehicle performing a driving event, according to one or more aspect of the disclosure.

FIG. 4A depicts a flow diagram for an illustrative method of determining a reward for obtaining and rating a video of another vehicle performing a driving event, according to one or more aspect of the disclosure. The method of FIG. 4A and/or one or more steps thereof may be performed by a computing device illustrated in FIG. 2. The method illustrated in FIG. 4A and/or one or more steps thereof may be partially or fully embodied, for example, in computer-executable instructions that are stored in a computer-readable medium, such as a non-transitory computer-readable memory. In some instances, one or more steps of FIG. 4A may be performed in a different order and/or combined. In some instances, one or more steps of FIG. 4A may be omitted and/or otherwise not performed.

At 402, an insurance provider, or other business organization, may offer to enroll a plurality of customers into a rewards program, where the rewards program may incentivize the plurality of customers to obtain and rate videos of other vehicles performing a driving event. The driving event may correspond to a dangerous activity performed by the driver of the other vehicle 240, such as hard turning, hard braking, swerving, improper lane usage, tailgating, or otherwise not driving with sufficient caution based on the conditions. At 404, if the customer enrolls, the insurance provider may allow the customer to select a desired incentive. In other cases, the insurance provider may assign a particular incentive to the customer. The incentives may include a discount to an insurance premium, points to be applied to another existing rewards program, cash payments based on a number of videos provided and/or the quality of the videos or ratings provided. The incentives selected may be adjusted and/or removed based on the performance of the customer, e.g., based on the number of videos provided and/or the quality of the videos or ratings provided. In some cases, the incentives selected may be adjusted and/or removed based on a video quality and/or the performance of the video once uploaded to a social network for viewing. For example, greater weight may be given to higher quality videos or videos having an easily identifiable driving event and/or based on whether how helpful the video is when determining an underlying risk associated with the driver of the vehicle that was captured on the video. Further, the incentives selected may be adjusted or removed based on a number of views, where a video with a higher number of views (e.g., a highly viewed video, a viral video, etc.) may have a higher incentive value than a video with a lower number of views.

At 406, once the customer has been enrolled, hardware and/or software applications may be provided to the customer for use in generating the videos, and any associated information that may be used in rating the video and providing an incentive to the customer. For example, the insurance provider may specify or provide a camera 214, one or more sensors (e.g., the proximity sensors 214, the vehicle operation sensors 212, etc.), and the telemetry device 216, to be installed in the vehicle 210 for use in generating the videos. In some cases, one or more software components (e.g., the event analyzer 230, etc.) may be incorporated with (or activated within) the vehicle computing system. In some cases, the insurance provider may provide an input device (e.g., the button 330, a microphone, etc.) for use by the driver or passenger, in the vehicle to trigger capture of the video and data associated with the driving event. In some cases, the customer may use a camera incorporated into the mobile device 218 to capture a video of the driving event and assign an event rating to the video such as by downloading and using the event analyzer 250 application. Here, the driver may trigger capture of the video using a physical button (e.g., via a wireless network such as Bluetooth), a touchscreen button on a display device (e.g., a display of the mobile device 218, a microphone (e.g., using voice recognition software), and/or the like. At 408, once a video has been captured, the customer may also enter additional information regarding the video, such as a rating. The event analyzer 250 may associate vehicle identification information, customer identification information, time information, location information, telemetry information, and/or the like to the video.

At 410, the accuracy of the rating the customer associates to the video may be evaluated, such as by using the rating analysis module 258 to compare the customer-assigned rating to a rating automatically generated by the event analyzer 230, to ratings entered by viewers of a social network 254, 290 entered via one or more user computing device 295, or a combination of ratings. The rating analysis module 258 may utilize an algorithm that eliminates ratings outliers and then combines the remaining rating values such as by computing a weighted average of the ratings. In evaluating the accuracy of the customer supplied rating, the aggregated rating may then be compared to the customer-defined event rating, such as by comparing the difference between the aggregated rating and the customer defined rating to a predetermined threshold. In some cases, a computing system may generate a user interface for viewing by an individual for use in evaluating the rating provided by the user, where the user interface may allow the individual to view the video, compare the video with other videos or otherwise evaluate the video quality and/or whether a driving event had been captured with or without rating analysis provided by the rating analysis module 258. At 412, based on the accuracy information, the incentive module 262 of the insurance provider computing system 260 may be used to generate the earned incentive based on a number of videos taken within a time frame, the accuracy of the ratings assigned to the videos and whether or not the videos may have been used by the insurance provider for educational purposes.

Figure 4B:
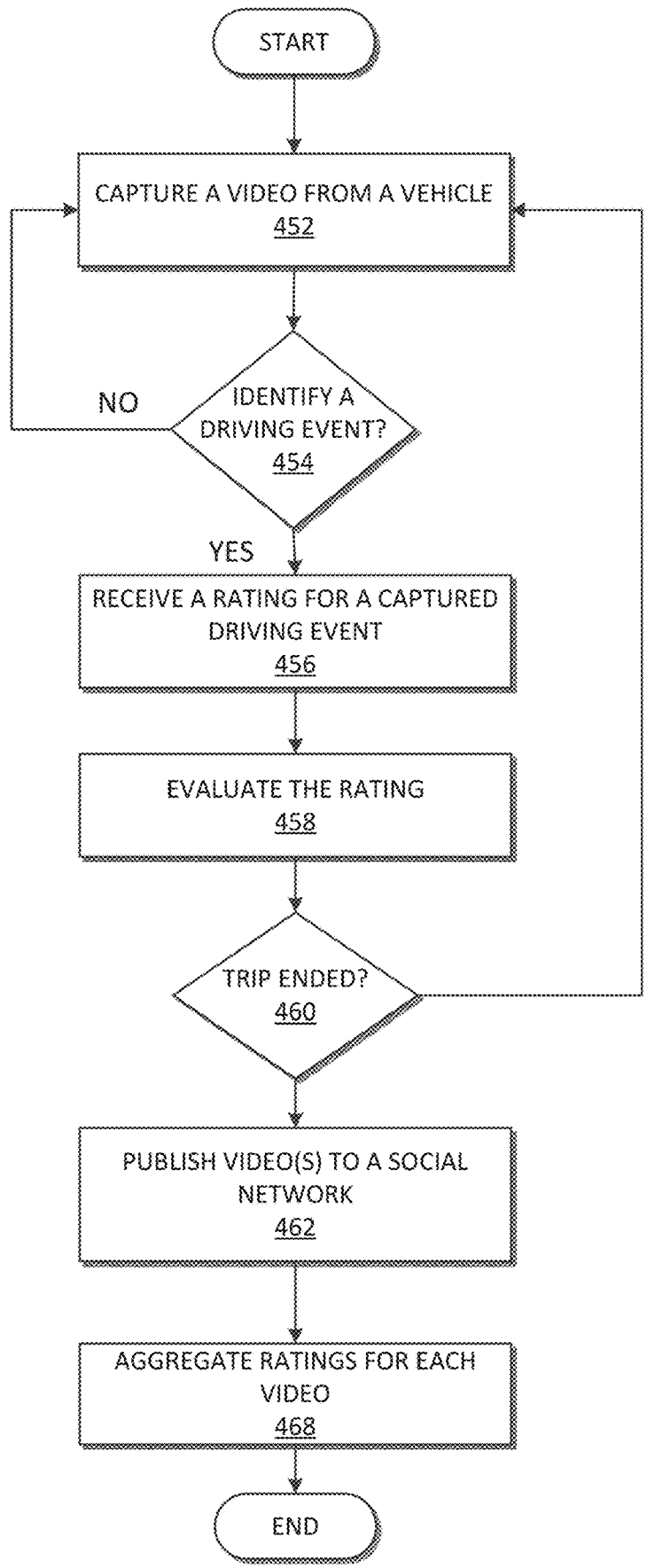
FIG. 4B depicts a flow diagram for an illustrative method of generating a video and determining a rating associated with the driving event captured on the video, according to one or more aspect of the disclosure.

FIG. 4B depicts a flow diagram for an illustrative method of generating a video and determining a rating associated with the driving event captured on the video, according to one or more aspect of the disclosure. The method of FIG. 4B and/or one or more steps thereof may be performed by a computing device illustrated in FIG. 2. The method illustrated in FIG. 4B and/or one or more steps thereof may be partially or fully embodied, for example, in computer-executable instructions that are stored in a computer-readable medium, such as a non-transitory computer-readable memory. In some instances, one or more steps of FIG. 4B may be performed in a different order and/or combined. In some instances, one or more steps of FIG. 4B may be omitted and/or otherwise not performed.

At 452, the camera 214 installed in the vehicle 210 may initiate capture of video data during a trip. In some cases, the user may initiate this video capture. In some cases, the video capture may be automatically initiated, such as by the event analyzer on the mobile device, when the event analyzer recognizes a trip has begun. For example, the event analyzer may process acceleration information, velocity information and/or location information to determine a changing geographic location of the vehicle 210. If a driving event has not been identified, at 454, video capture continues at 452. If, at 454, a driving event has been identified, the customer may be prompted to provide a rating to be associated to the driving event at 456. For example, a user may observe dangerous or unsafe driving, by the vehicle 240 and indicate that a driving event is occurring, such as by using the trigger 330. Once triggered, the video data may be transferred from a temporary memory location to a different memory location along with a combination of one or more of time information, weather information, traffic information, telemetry information, vehicle identification information, driver identification information, and/or the like. Once the video has been captured, the customer may provide a rating of the driving event via a user interface device (e.g., a microphone, a user interface screen, etc.). In some cases, the customer may immediately provide a rating, such as by using the microphone. In other cases, the customer may rate the driving event when the vehicle has stopped, or the trip has concluded. In such cases, the mobile device 218 or vehicle computing system may be configured to play back the captured video to the customer via the user interface of the mobile device 218 or vehicle computing system which may allow the customer to more accurately rate the driving event, where, in some cases, the user may utilize viewing controls during the evaluation (e.g., slow motion, reverse, fast forward, pause, stop, etc.).

Once rated, the video and additional information may be communicated to a memory location remote from the vehicle, such as to a cloud storage device and/or the video database 251. For example, a user may upload one or more videos to the cloud storage device, or other computing interface to the insurance provider computing system 260 and/or the video analysis computing system 250. Once received, the video data may be analyzed, such as by the event analyzer 230 and/or the rating analysis module 258 of the video analysis computing system 250. The video information may be communicated in near real time (e.g., while the vehicle 210 is on a trip) to the remote memory location such as via a cellular communications network. At 460, the event analyzer 230 may determine whether the current trip has ended. If not, the camera 214 may continue to capture video until the trip has ended. If so, the video analysis computing system, at 462, may seek input from a user regarding one or more videos that may be published to the private social network 254 and/or the public social network 290. For example, a user may be presented with a screen listing by name or at least with an image or copy of the videos that may be uploaded to the private social network 254 and/or the public social network 290, upon verification. Once published, one or more viewers may access the videos via the user computing devices 295 and provide a rating for each driving event captured. The video analysis computing system 250 may then aggregate the ratings for each video at 468.

Figure 5:
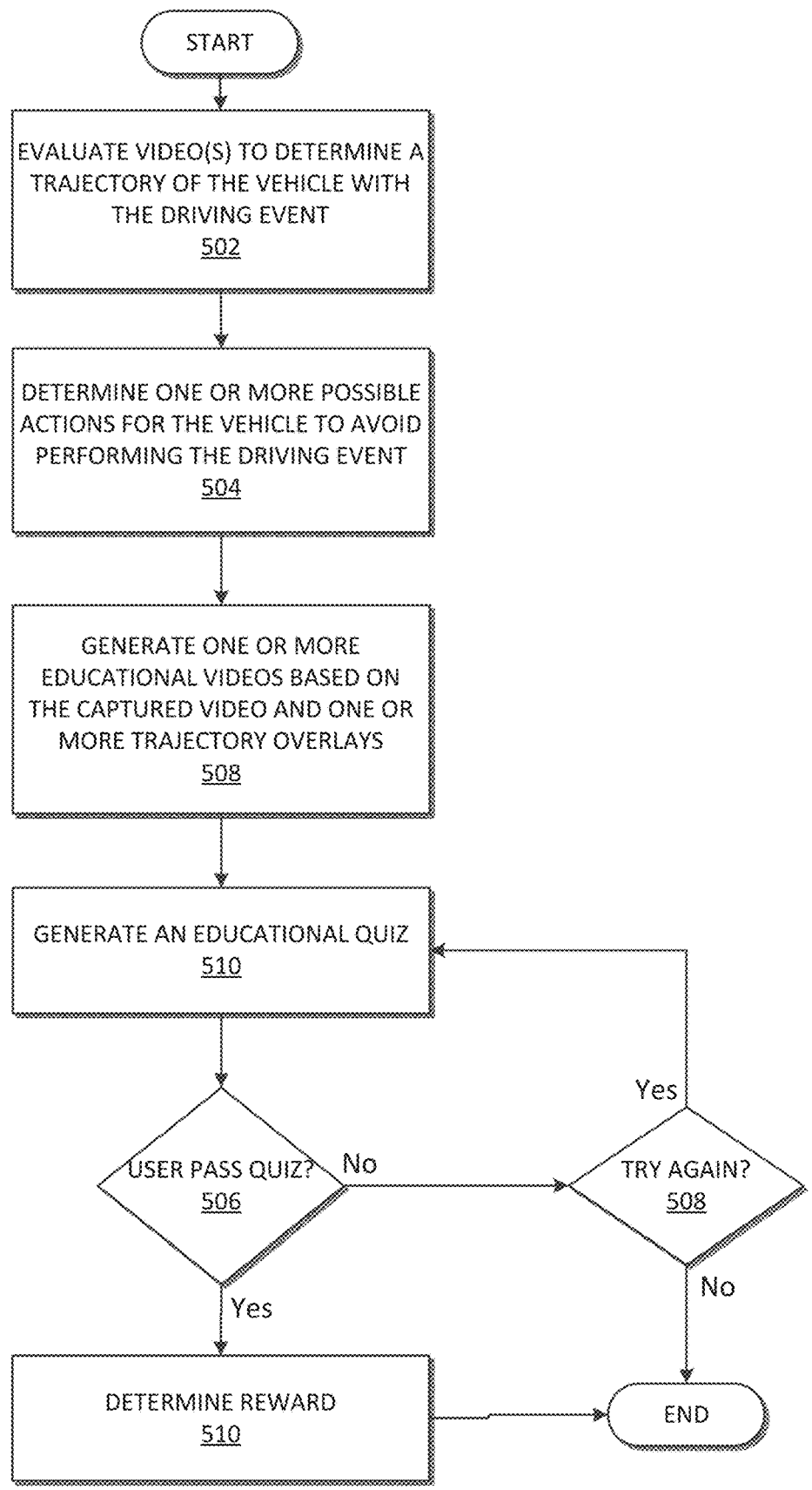
FIG. 5 depicts a flow diagram for an illustrative method of generating and presenting an educational video based on the captured video of a vehicle performing a driving event, according to one or more aspect of the disclosure.

FIG. 5 depicts a flow diagram for an illustrative method of generating and presenting an educational video based on the captured video of a vehicle performing a driving event, according to one or more aspect of the disclosure. The method of FIG. 5 and/or one or more steps thereof may be performed by a computing device illustrated in FIG. 2. The method illustrated in FIG. 5 and/or one or more steps thereof may be partially or fully embodied, for example, in computer-executable instructions that are stored in a computer-readable medium, such as a non-transitory computer-readable memory. In some instances, one or more steps of FIG. 5 may be performed in a different order and/or combined. In some instances, one or more steps of FIG. 5 may be omitted and/or otherwise not performed.

At 502, the one or more videos captured by the customer may be evaluated to determine whether the driving event may be useful in educating drivers about dangerous and/or unsafe behavior when operating machinery. Here, once determined that the video may be useful, the educational analysis module 268 may be configured to analyze the video, with our without the additional captured information, such as to determine a trajectory of the vehicle 240 during the driving event. At 504, the driving solution modelling system 264 may be used to model one or more aspects of the video so that at least one corrected trajectory may be calculated, such that the driving event may have been avoided. At 508, one or more educational videos may be generated, such as by the educational analysis module, using the captured videos and the calculated trajectories that may allow the user to identify ways to avoid a particular driving event. In some cases, the educational vehicles may comprise at least a portion of a computerized rendering of a driving event corresponding to the video, such that identification information of a vehicle and/or person shown on the video may be obfuscated. Once generated, the quiz may be presented to the user for completion. If the user passes the quiz, the customer receive a reward or other incentive at 410. If the user does not pass the quiz at 506, the user may be prompted to reattempt the quiz. If the user elects to retake a quiz at 508, a new quiz may be generated. at 510 and presented to the user.

Figure 6:
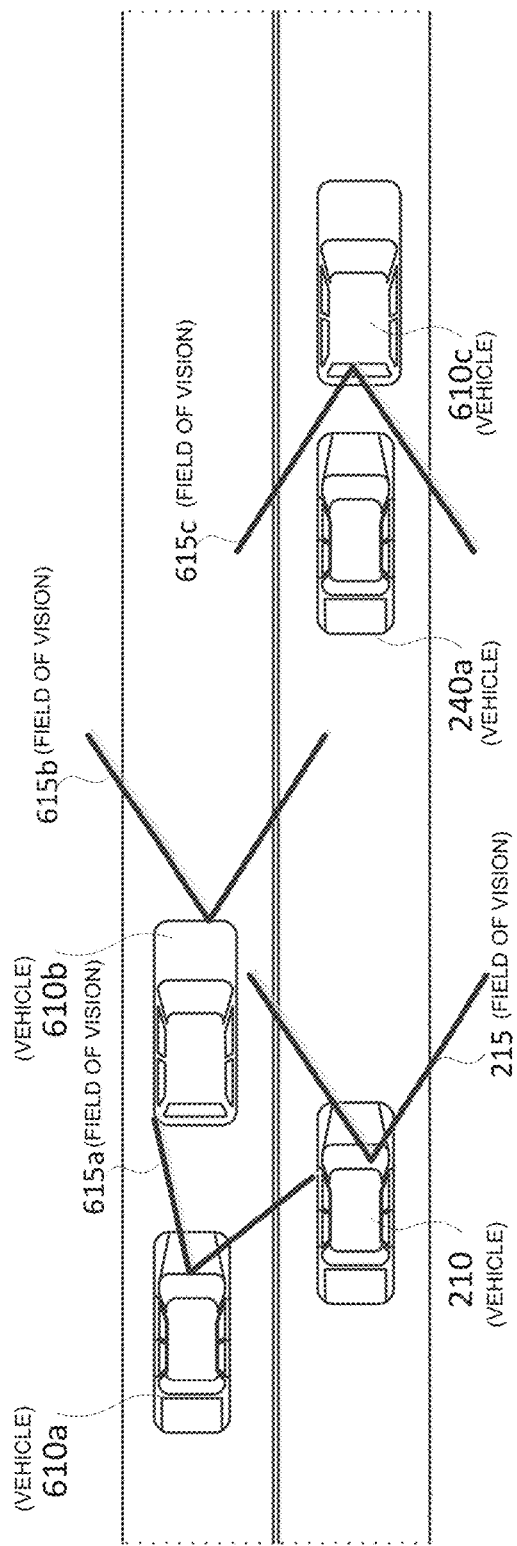
FIGS. 6 and 7 depict an illustrative top view of multiple vehicles traversing a street or road, according to one or more aspects of the disclosure.
Figure 7:
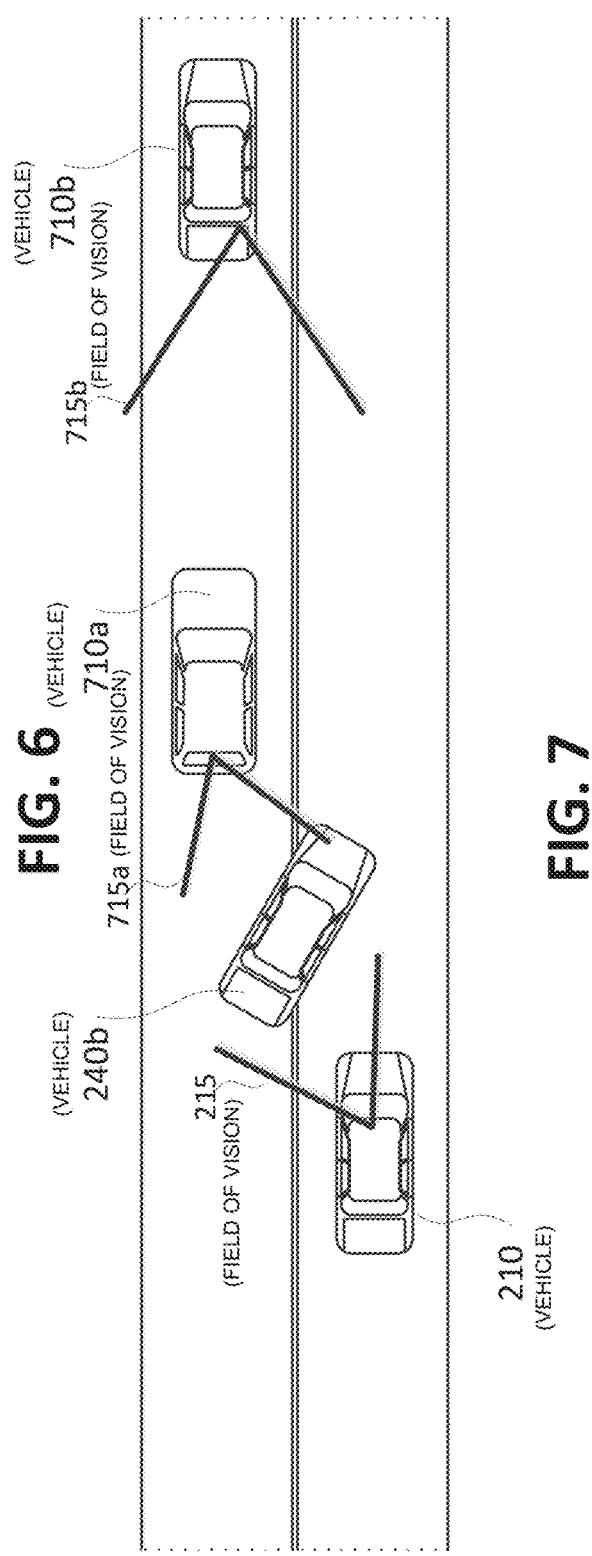

FIGS. 6 and 7 depict an illustrative top view of multiple vehicles traversing a street or road, according to one or more aspects of the disclosure. FIG. 6 illustrates a roadway with traffic including the vehicle 210, the vehicle 240a performing a driving event, and other vehicles 610a-c. Here, a plurality of vehicles may capture a same driving event. In such cases, the ratings may be aggregated upon entry into the computing system. For example, each car may include a camera 214 having a field of view 215, 615a-c. In some cases, the vehicles may include a forward facing camera 218 (e.g., vehicle 210, 610a, 610b), a rear facing camera (e.g., vehicle 610c) or both As can be seen, vehicle 240a may be performing a driving event of tailgating vehicle 610c that may be captured by a plurality of uninvolved vehicles, such as vehicles 210, 610a, and 610b. In other instances, the vehicle 610c may be configured to capture driving events associated with the vehicle 610c. FIG. 7 illustrates a vehicle 240b performing a driving event of an unsafe lane change, where vehicle may capture a video within the field of view 215, the vehicle 710 may capture the video of the driving event within the field of view 715a, and vehicle 710b may capture the video of the driving event within the field of view 715b.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:
1. A system comprising:
a video capture device associated with a first vehicle and having a viewing angle capable of capturing a video of one or more other vehicles;
a first memory location communicatively coupled to the video capture device, wherein the first memory location stores a video captured by the video capture device;
a processor executing instructions that cause the processor to:
analyze, without user input and using a video analysis algorithm, the captured video stored in the first memory location to determine a driving event performed by a second vehicle in the captured video;
determine, by an event analyzer, a first event rating indicating a level of danger of the driving event with respect to at least one of: a driver of the second vehicle, a driver of the first vehicle, the second vehicle and the first vehicle, wherein determining the first event rating includes:

aggregating other event ratings of the same driving event from a plurality of sources other than the driver of the second vehicle;
removing ratings outliers from the other event ratings; and
combining remaining ratings of the other event ratings to determine the first event rating;
receive a second event rating of the driving event from the driver of the second vehicle;
determine an accuracy of the second event rating relative to the first event rating;
determine an incentive to provide the driver of the second vehicle based on the determined accuracy of the second event rating.

2. The system of claim 1, wherein the instructions further cause the processor to:
evaluate the driving event captured in the video to determine a first trajectory of the second vehicle during the driving event;
generate, for display in a graphical user interface, a computer visualization of at least one second trajectory for the second vehicle, including digitally modelling one or more actions of a driver of the second vehicle, wherein the at least one second trajectory comprises a path for the second vehicle to travel to avoid causing the driving event; and
generate an educational video, including visually overlaying the computer visualization of the at least one second trajectory to avoid performing the driving event on the captured video showing the second vehicle performing the driving event, by modifying underlying digital video data of the captured video.

3. The system of claim 2 comprising:
the first vehicle, wherein the video capture device is physically attached to the first vehicle, and
wherein generating the educational video includes generating a computer rendering of a driving event corresponding to the video.

4. The system of claim 1, wherein the video capture device is physically incorporated into a mobile device.

5. The system of claim 1, wherein aggregating the other event ratings of the same driving event from the plurality of sources other than the driver of the second vehicle includes:
transmitting at least a portion of the captured video to a social network platform; and
receiving the other event ratings from a plurality of users on the social network platform.

6. The system of claim 1, wherein determining the incentive is performed further based on a number of videos taken of the driver of the second vehicle within a specified time frame.

7. The system of claim 1, wherein the video capture device captures the video for a predetermined time period before a trigger, the trigger causing the captured device to be stored into storage.

8. A method comprising:
analyzing, without user input and using a video analysis algorithm, captured video stored in memory to determine a driving event performed by a first vehicle in the captured video, the video captured by a video capture device associated with a second vehicle;
determining, by an event analyzer, a first event rating indicating a level of danger of the driving event with respect to at least one of: a driver of the first vehicle, a driver of the second vehicle, the first vehicle and the second vehicle, wherein determining the first event rating includes:
aggregating other event ratings of the same driving event from a plurality of sources other than the driver of the first vehicle;
removing ratings outliers from the other event ratings; and
combining remaining ratings of the other event ratings to determine the first event rating;
receiving a second event rating of the driving event from the driver of the first vehicle;
determining an accuracy of the second event rating relative to the first event rating; and
determining an incentive to provide the driver of the first vehicle based on the determined accuracy of the second event rating.

9. The method of claim 8, further comprising:
evaluating the driving event captured in the video to determine a first trajectory of the first vehicle during the driving event;
generating, for display in a graphical user interface, a computer visualization of at least one second trajectory for the first vehicle, including digitally modelling one or more actions of a driver of the first vehicle, wherein the at least one second trajectory comprises a path for the first vehicle to travel to avoid causing the driving event; and
generating an educational video, including visually overlaying the computer visualization of the at least one second trajectory to avoid performing the driving event on the captured video showing the first vehicle performing the driving event, by modifying underlying digital video data of the captured video.

10. The method of claim 9, wherein the video capture device is physically attached to the first vehicle, and
wherein generating the educational video includes generating a computer rendering of a driving event corresponding to the video.

11. The method of claim 8, wherein the video capture device is physically incorporated into a mobile device.

12. The method of claim 8, wherein aggregating the other event ratings of the same driving event from the plurality of sources other than the driver of the second vehicle includes:
transmitting at least a portion of the captured video to a social network platform; and
receiving the other event ratings from a plurality of users on the social network platform.

13. The method of claim 8, wherein determining the incentive is performed further based on a number of videos taken of the driver of the second vehicle within a specified time frame.

14. The method of claim 8, wherein the video capture device captures the video for a predetermined time period before a trigger, the trigger causing the captured device to be stored into storage.

15. A non-transitory computer readable medium storing computer-readable instructions that, when executed, cause an apparatus to:
analyze, without user input and using a video analysis algorithm, captured video stored in memory to determine a driving event performed by a first vehicle in the captured video, the video captured by a video capture device associated with a second vehicle;
determine, by an event analyzer, a first event rating indicating a level of danger of the driving event with respect to at least one of: a driver of the first vehicle, a driver of the second vehicle, the first vehicle and the second vehicle, wherein determining the first event rating includes:

aggregating other event ratings of the same driving event from a plurality of sources other than the driver of the first vehicle;

removing ratings outliers from the other event ratings; and combining remaining ratings of the other event ratings to determine the first event rating;

receive a second event rating of the driving event from the driver of the first vehicle;

determine an accuracy of the second event rating relative to the first event rating; and determine an incentive to provide the driver of the first vehicle based on the determined accuracy of the second event rating.

16. The non-transitory computer readable medium of claim 15, wherein the apparatus is further caused to:

evaluate the driving event captured in the video to determine a first trajectory of the first vehicle during the driving event;

generate, for display in a graphical user interface, a computer visualization of at least one second trajectory for the first vehicle, including digitally modelling one or more actions of a driver of the first vehicle, wherein the at least one second trajectory comprises a path for the first vehicle to travel to avoid causing the driving event; and generate an educational video, including visually overlaying the computer visualization of the at least one second trajectory to avoid performing the driving event on the captured video showing the first vehicle performing the driving event, by modifying underlying digital video data of the captured video.

17. The non-transitory computer readable medium of claim 16, wherein the video capture device is physically attached to the first vehicle, and wherein generating the educational video includes generating a computer rendering of a driving event corresponding to the video.

18. The non-transitory computer readable medium of claim 15, wherein the video capture device is physically incorporated into a mobile device.

19. The non-transitory computer readable medium of claim 15, wherein aggregating the other event ratings of the same driving event from the plurality of sources other than the driver of the second vehicle includes:

transmitting at least a portion of the captured video to a social network platform; and receiving the other event ratings from a plurality of users on the social network platform.

20. The non-transitory computer readable medium of claim 15, wherein determining the incentive is performed further based on a number of videos taken of the driver of the second vehicle within a specified time frame.

* * * * *